US010232818B2

United States Patent
Jenny

(10) Patent No.: US 10,232,818 B2
(45) Date of Patent: Mar. 19, 2019

(54) MOTOR VEHICLE WITH PEDESTRIAN AIRBAG

(71) Applicant: GM GLOBAL TECHNOLOGY OPERATIONS LLC, Detroit, MI (US)

(72) Inventor: Thomas Jenny, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/480,016

(22) Filed: Apr. 5, 2017

(65) Prior Publication Data

US 2017/0282847 A1    Oct. 5, 2017

(30) Foreign Application Priority Data

Apr. 5, 2016  (DE) .................. 10 2016 004 111

(51) Int. Cl.
*B62D 25/10* (2006.01)
*B60R 21/36* (2011.01)
*B60R 21/38* (2011.01)

(52) U.S. Cl.
CPC .............. *B60R 21/36* (2013.01); *B60R 21/38* (2013.01)

(58) Field of Classification Search
CPC . B60R 21/36; B60R 21/38; B60R 2021/0004; B60R 2021/003
USPC ............................ 180/69.2, 274; 296/187.04
See application file for complete search history.

(56) References Cited

U.S. PATENT DOCUMENTS

| 6,293,362 B1* | 9/2001 | Sasaki | E05B 77/08 |
| | | | 180/274 |
| 7,231,995 B1* | 6/2007 | Polz | B60R 21/34 |
| | | | 16/222 |
| 7,303,040 B2* | 12/2007 | Green | B60R 21/38 |
| | | | 180/274 |
| 7,410,027 B2 | 8/2008 | Howard | |
| 7,537,073 B2 | 5/2009 | Kalliske et al. | |

(Continued)

FOREIGN PATENT DOCUMENTS

DE    102005022924 A1    11/2006
DE    102007033796 A1    1/2009

(Continued)

OTHER PUBLICATIONS

German Patent Office, German Search Report for German Application No. 102016004111.0, dated Dec. 19, 2016.

*Primary Examiner* — Toan C To
(74) *Attorney, Agent, or Firm* — Lorenz & Kopf, LLP

(57) ABSTRACT

A motor vehicle includes a hinge mechanism supporting a hood and an airbag configured to deploy close to or into the exterior of the motor vehicle for protecting pedestrians. The hinge mechanism is operably for positioning the hood in a normal closed position to close off an engine compartment and a normal open position providing access to the engine compartment for servicing work. The hinge mechanism has a breakable connecting element for connecting a first part and a second part of the hinge mechanism. In the event of an accident the connecting element is broken, so that a rear end area of the hood is movable from the normal closed position into an accident position which is partly open in the area of the front windscreen. The second part is supported by a mechanism such that the hood is movable relative to the body.

19 Claims, 3 Drawing Sheets

(56) References Cited

U.S. PATENT DOCUMENTS

| | | | |
|---|---|---|---|
| 7,591,333 B1 * | 9/2009 | Polz | B60R 21/34 180/69.2 |
| 7,845,691 B2 * | 12/2010 | Sundararajan | B60R 21/38 180/274 |
| 9,855,916 B2 * | 1/2018 | Hwang | B60R 21/38 |
| 2005/0179286 A1 * | 8/2005 | Adachi | B60R 21/38 296/193.11 |
| 2007/0080010 A1 * | 4/2007 | Gust | B60R 21/38 180/69.2 |

FOREIGN PATENT DOCUMENTS

| | | | |
|---|---|---|---|
| DE | 102004062105 B4 | 8/2009 | |
| DE | 102009040413 A1 | 3/2011 | |
| DE | 102009041418 A1 | 4/2011 | |
| EP | 1295763 A2 | 3/2003 | |
| EP | 2351671 A1 | 8/2011 | |
| GB | 2354797 A | 4/2001 | |
| GB | 2368562 A | 5/2002 | |
| JP | 2004322724 A | 11/2004 | |
| JP | 2006062504 A | 3/2006 | |
| JP | 2006240558 A | 9/2006 | |
| JP | 2007191102 A | 8/2007 | |
| WO | 0386826 A1 | 10/2003 | |

\* cited by examiner

MOTOR VEHICLE WITH PEDESTRIAN AIRBAG

CROSS-REFERENCE TO RELATED APPLICATION

This application claims priority to German Patent Application No. 102016004111.0, filed Apr. 5, 2016, which is incorporated herein by reference in its entirety.

TECHNICAL FIELD

The present disclosure pertains to a motor vehicle, and more particularly to a hinge mechanism supporting a bonnet or hood and an airbag configured to deploy close to or into the exterior of the motor vehicle for protecting pedestrians.

BACKGROUND

Motor vehicles are equipped with additional airbag modules as pedestrian airbag modules having a gas generator and an airbag for protecting pedestrians, and for deployment in the area of the motor vehicle exterior, particularly a front windscreen. Airbag modules of this type are used to provide impact protection for pedestrians, cyclists or other similar road users in the event of a collision in the area of the front windscreen or windshield and the A pillars as well as in the area of the hood (also known as the bonnet), and the fenders. The airbag is thus deployable in the area of the front windscreen and/or the A pillars and/or the hood and/or at least one fender for providing additional protection for pedestrians, cyclists or similar road users in the event of an impact with the motor vehicle.

The hood is supported in the area of the corners of the hood and close to the front windscreen by two hinge mechanisms for opening the hood so as to be pivotable from a normal closed position to a normal open position to allow access to the engine compartment for servicing or maintenance purposes. In situations in which a collision with a pedestrian or cyclist is imminent, this is detected by a corresponding sensor, and a mechanism is activated to unlock the two hinge mechanisms for the pivoting hood support, so that the hood can be raised with a device from a normal closed position to an accident position, in which it is partly open in the area of the front windscreen. As a result of this partial opening of the hood in the area of the front windscreen the airbag for the front windscreen and/or at least one A-pillar, the hood and at least one fender can be deployed through a slit-like opening created thereby. The device for raising the hood in the area of the front windscreen may be a pyrotechnic propellant charge or a hydraulic or pneumatic device. In addition, it is also necessary to unlock the two hinge mechanisms which may also be accomplished with a pyrotechnic propellant charge or a hydraulic or pneumatic device. Accordingly, an additional device for raising the hood and an additional mechanism for releasing the hinges are needed.

DE 102 52 285 A1 discloses a hinge for attaching a hood to a motor vehicle body. The hinge is designed such that it releases the hood in the event of an accident with a pedestrian. When the hood is pivoted from a normal closed to a normal open, the rear end area of the hood is not able to make any further vertically upward movement.

SUMMARY

The present disclosure provides a motor vehicle in which the hinge mechanism reliably allows the hood to move both for servicing work and in the event of an accident. The motor vehicle includes a vehicle body, a drive motor, such as an electric motor and/or an internal combustion engine, at least one airbag module with a gas generator and an airbag for protecting pedestrians. The airbag is configured to deploy close to or into the exterior of the motor vehicle. At least one hinge mechanism is provided to pivot a hood so that in a normal closed position of the hood an engine compartment is closed off and after the hood is pivoting into a normal open position the engine compartment is accessible for servicing work. The hinge mechanism has a connecting element for connecting a first part of the hinge mechanism to a second part of the hinge mechanism, and in the event of an accident the connection created by the connecting element between the first and second parts may be broken to enable a rear end area of the hood to move from the normal closed position into an accident open position, in which the hood is partly open in the area of the front windscreen. The second part is mounted so as to be movable relative to the body with a mechanism. If the motor vehicle is involved in an accident, this enables the rear end area of the hood to be moved from the normal closed position into an accident open position, in which the hood is partly open in the area of the front windscreen, since a vertically upward movement of the rear end area of the hood is rendered possible as a result of the movement of the second part relative to the body.

In particular, the second part is movable relative to the body both when the hood is pivoted for servicing work and when the rear end area of the hood is moved from a normal closed position into an accident open position, in which the hood is partly open in the area of the front windscreen. The second part of the hinge mechanism is thus moved relative to the body both when the hood is pivoted from the closed into the normal open position and when the hood is moved from the normal closed position into the partly open accident position. The second part is thus included in all movements of the hinge mechanism.

In a further variant, the first part is permanently affixed to the hood, so that the first part is included in all the same movements as the hood. The first part is permanently affixed to the hood, or it may also be integral with the hood. The first part is thus permanently connected to the hood by a threaded, riveted or welded connection, for example, if the first part is a separate part.

In a complementary embodiment, the first and second parts are connected to each other via a pivot.

Preferably, relative movement between the first and the second part is blocked in a connection between the first and second part because the connecting element is locked and due to the connection of the first and second parts with the pivot. When relative movement between the first and the second parts is blocked, the motion kinematics of hood is affected exclusively by the mechanism between the second and the third parts of the hinge mechanism.

In one variant when the connection between the first and second parts is broken because the connecting element is unlocked and due to the connection between the first and second parts with the pivot, the first and second parts are pivotable towards each other about a pivot axis on the pivot to move the rear end area of the hood from a normal closed position into an accident open position, in which the hood is partly open in the area of the front windscreen. When the connecting element is locked, the relative movement between the first and second parts is blocked, and when the connecting element is unlocked the second part is movable relative to the first part or vice versa. Consequently, the kinematics of the hood, i.e. its movement from the normal closed position in into the partly open accident position, can be changed in the event of an accident, so that the kinematics of the movement in the event of an accident is influenced both by the mechanism and by the relative movement between the first and second parts, and during an accident the rear end area of the hood completes a vertically upward movement to create a slit-like opening between the rear end area of the hood and the engine compartment in the area of the front windscreen and to enable a larger deformation path for the hood vertically downwards.

The mechanism is expediently formed by an auxiliary pivot or at least one lever, and the lever is indirectly or directly attached pivotably to a first hinge on the body and attached pivotably to a second hinge on the second part.

In a further embodiment, the mechanism includes two levers and/or a spring-loaded unlocking rod, which causes movement of the rod with the attached unlocking element by spring force and bring about unlocking. In particular, the connecting element is realized as a bolt or pin or a spring plate.

In a further variant, the connecting element is connected permanently to the first part and detachably to the second part or vice versa. In a complementary variant, the connecting element is detachably connectable to the second part or first part via a fixing mechanism, and the fixing mechanism is actuatable by the airbag deployed during the accident. In particular, the airbag exerts a force on the fixing mechanism so that the actuation of the fixing mechanism is able to break the connection formed between the first and the second parts by the connecting element. The force can be or is applied by the airbag to the fixing mechanism directly or indirectly with a flap in the airbag module.

In a further variant, the fixing mechanism includes a pivotable locking and unlocking lever and/or a lever linkage and/or a spring-loaded pull bar, which is able to move the connecting element by spring force.

In an additional variant, the fixing mechanism includes an auxiliary lever, and initially the force of the airbag is or can be applied to the auxiliary lever, which force then is or can be applied by the auxiliary lever to the pivotable locking and unlocking lever. The force released during deployment of the airbag is and/or has been applied indirectly to the locking and unlocking lever.

In an additional variant, the force of the airbag may be applied to the fixing mechanism indirectly by a flap in the airbag module.

In a further variant, the first part is designed substantially as a plate. The first part is fastened to the hood with a threaded, riveted or welded connection, for example the first part is permanently attached to the hood, and there is no relative movement between the first part and the hood. In an additional variant, the second part is realized as a rod or strut.

In an advantageous variant, the motor vehicle includes a sensor for detecting an imminent collision, particularly with a pedestrian or a cyclist or similar road user. The airbag can be deployed to the exterior of the front windscreen and/or the hood and at least one fender of the motor vehicle when the rear end area of the hood moves from a normal closed position into the accident position in which the hood is partly open in the area of the front windscreen. The first part cannot be deformed and/or such deformation is not necessary and/or the hood is arrestable with a detent mechanism in the accident position and/or the kinematics of the mechanism is designed to the effect that pivoting of the hood from the normal closed position into the normal open position is additionally dependent on a vertically upward movement of the rear end area of the hood and vice versa.

In a further variant, when the connecting element is locked, a connection between the first part and the second part is provided by the connecting element, and when the connecting element is unlocked no connection is provided between the first part and the second part by the connecting element.

In a complementary variant, the connection between the first part and the second part provided by the connecting element can be broken when the connecting element makes a movement, particularly a translational movement. The connecting element has the form of a bolt, a metal strip or a pin for example, which is secured in through holes in the first and second part, and the bolt or pin may be moved out of a through hole due a movement of the bolt or pin in a direction of a longitudinal axis of the bolt or pin, so that the connection between the first and second parts provided by the connecting element may be broken. The movement of the bolt or pin may preferably be caused by a force applied by the fixing mechanism to the bolt or pin, or by a pull bar that is set in motion by a spring force.

The airbag module described in this application for a protective right is at least a pedestrian protection airbag module with a gas generator and an airbag for protecting pedestrians and for deployment in an external area of the motor vehicle. In a complementary variant, the motor vehicle includes two airbag modules, each including a gas generator and an airbag for protecting pedestrians and for deployment in an external area of the motor vehicle and/or the motor vehicle includes two hinge mechanisms.

In a further variant, the rear end area of the hood is movable vertically upwards under the effect of the force applied to the hood, and/or the hood is movable from the normal closed position into the partly open accident position under the effect of the force when the at least one airbag is deployed under the hood.

In a further variant, the force required to unlock the connecting element may be applied indirectly or directly to the connecting element by the airbag and/or by the flap of the airbag module and/or by a deformation of a wall of the airbag module housing, indirectly with the locking and unlocking lever for example. The unlocking of the connecting element is the changing of the connecting element from the locked state to the unlocked state.

The hinge mechanism advantageously includes one detent device each for arresting the at least one hinge mechanism in the partly open accident position, in particular the detent device includes a detent bolt and a detent lever.

In a further variant, the motor vehicle has at least one seat with a seat part and a backrest.

In a complementary variant, the at least one airbag module with a gas generator and an airbag for protecting pedestrians and for deploying in an external area of the motor vehicle is provided in the area of the hinge mechanism for die hood, in particular the at least one airbag module is located at a distance of less than 30 cm, 20 cm, 10 cm or 5 cm from the hinge mechanism for the hood. Because of this small distance, the hinge mechanism may be actuated easily by the deploying airbag.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
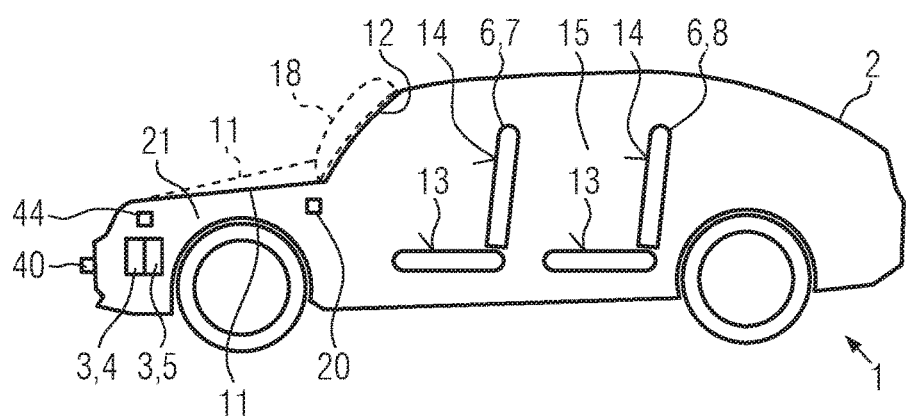
FIG. 1 shows a side view of a motor vehicle.

A motor vehicle 1 represented in FIG. 1 has a body 2 made of metal, particularly steel. Motor vehicle 1 is propelled by a drive motor 3, for example an electric motor 4 and/or an internal combustion engine 5 in an engine compartment 21. Body 2 delimits an interior 15, and in the interior 15, two seats 6 are arranged as front seats 7 and three seats 6 are arranged as rear seals 8. The three rear seats 8 are combined as a bench seat. Front seat 7 includes a seat part 9 and a backrest 10. Seat part 9 of front seat 7 has a seating surface 13 on which a person may sit, and backrest 10 of seat 6 as the front seat 7 has a back surface 14 against which the back of a person seated in seat 6 is supported.

Motor vehicle 1 includes two airbag modules 16 (FIG. 4), each with a gas generator 17 and an airbag 18 configured as a pedestrian airbag 18 for protecting pedestrians, cyclists or similar road users and for deployment in and/or on an external area of motor vehicle 1, particularly on a front windscreen 12 and/or on at least on A-pillar and/or on a partial area of hood (also known as a bonnet) 11 and/or for deployment in an external area of both vehicle fenders. Airbag module 16 includes an airbag module housing 19 made from reinforced plastic and/or metal, and the airbag 18 and gas generator 17 are arranged inside the airbag module housing 19. A sensor 40 for detecting an imminent collision with a pedestrian, a cyclist or a similar road user is fitted in the area of a front bumper of motor vehicle 1. The data captured by sensor 40 is analyzed by a controller or regulating unit, and if a collision is imminent the controller or regulating unit triggers the activation of the two airbag modules 16.

A hood 11 is supported so as to be pivotable about a pivot axis by two hinge mechanisms 20. Pivot axis for pivoting hood 11 extends horizontally and in the transverse direction of motor vehicle 1. For purposes of service or maintenance of drive motor 3, hood 11 may thus be pivoted about the pivot axis, thereby enabling access to drive motor 3 and engine compartment 21. Hinge mechanisms 20 are each arranged and secured in corner areas of hood 11 close to front windscreen 12, thereby enabling a front end of hood 11 to be moved upwards when hood 11 is pivoted and opened for purposes of servicing or maintaining drive motor 3. The pivot axis of hood 11 is thus in the area of or close to a rear end of hood 11 or a lower end of front wind-screen 12. For servicing or maintenance, a latching element 44 on the front end area of hood 11 must be unlocked before hood 11 is opened.

In FIG. 1, the normal closed position of hood 11 is represented with a solid line, and the partly open accident position of hood 11 is represented in FIG. 1 with a dashed line. The airbag 18 deployed on the outside of front windscreen 12 is also represented by a dashed line in FIG. 1. The normal open position of hood 11 is not represented in FIG. 1.

Hinge mechanism 20 serves to pivot hood 11 from the normal closed position into the normal open position for servicing work in engine compartment 21. If an accident occurs or is imminent, particularly with a pedestrian, a cyclist or a similar road user, hinge mechanism 20 also serves to raise the rear end area of hood 11 slightly, so that a slit-like opening is created below the rear end area of hood 11, from which the two airbags 18 can be deployed to the exterior of motor vehicle 1. With this slight raising of the rear end area of hood 11, the hood 11 advantageously also has a larger deformation path.

Figure 2:
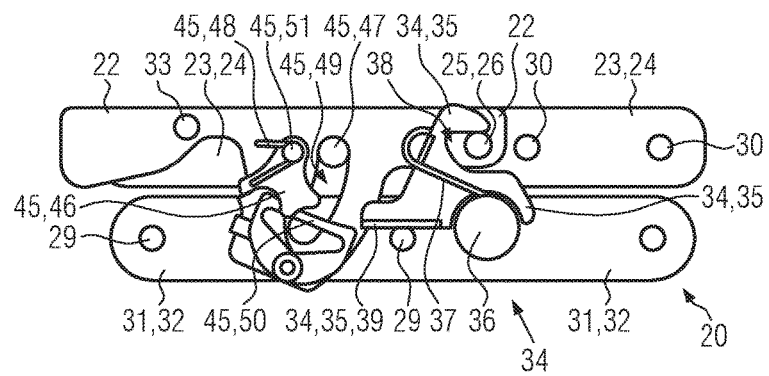
FIG. 2 shows a perspective view of a hinge mechanism with the hood or bonnet in a normal closed position.
Figure 3:
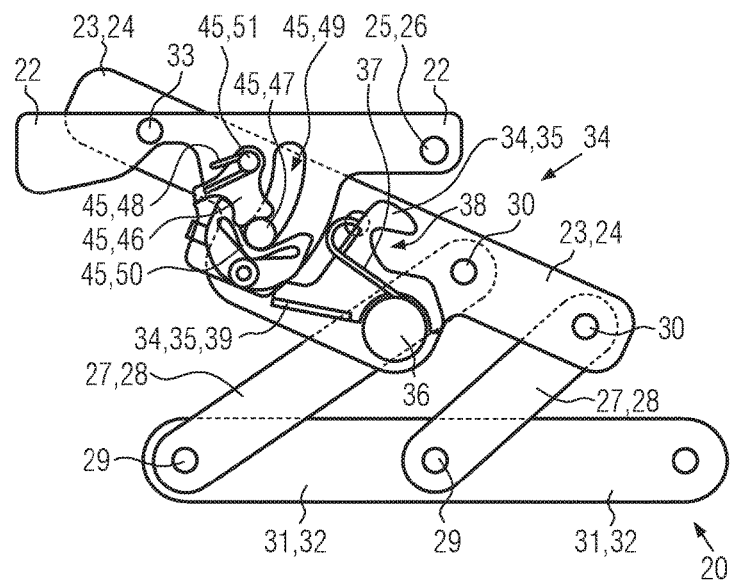
FIG. 3 shows a side view of the hinge mechanism with the hood in a partly open accident position.

Hinge mechanism 20 includes a first part 22, a second part 23 in the form of a strut 24 or rod 24, and a third part 31. First part 22 is attached permanently to hood 11, and third part 31 is attached permanently to body 2. First part 22 has a plate-like section now shown in FIGS. 2 and 3. The first part 22 is attached to hood 11 with this plate-like section, which is aligned perpendicularly to the drawing plane of FIG. 2 and FIG. 3. It is thus impossible for any relative movement to occur between first part 22 and hood 11, and relative movement is similarly impossible between third part 31 and body 2. Second part 23 is connected movably to a mechanism 27 and/or pivotably to third part 31. Mechanism 27 includes two levers 28. At the bottom ends of the two levers 28, each lever 28 is connected in articulated manner to third part 31 via a first hinge 29, and at an upper end area of the levers 28 each lever 28 is connected in articulated manner to second part 23 via a second hinge 30. At the end areas of the first and second parts 22, 23, first part 22 and second part 23 are permanently connected to each other in articulated manner via a pivot 33 (FIG. 3).

Figure 4:
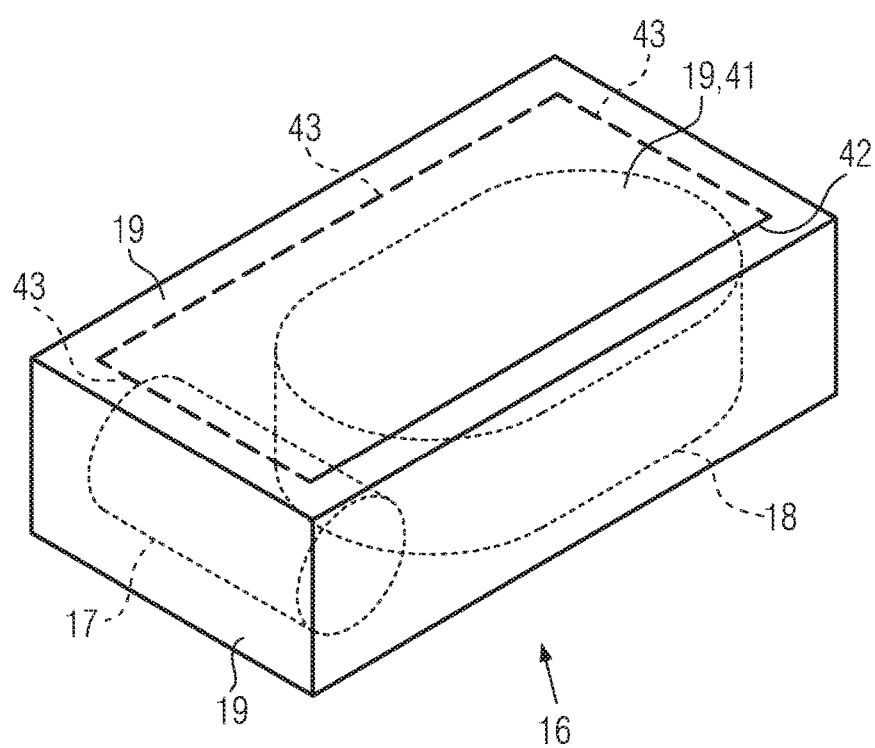
FIG. 4 shows a side view of an airbag module.

Hinge mechanism 20 also includes a connecting element 25 in the form of a bolt 26 and a fixing mechanism 34. Connecting element 25 is attached permanently to first part 22. Fixing mechanism 34 is formed by a locking and unlocking lever 35, and locking and unlocking lever 35 is connected in articulated manner to second part 23 via a hinge 36, so that locking and unlocking lever 35 is pivotable relative to second part 23 about a pivot axis transversely to motor vehicle 1 by hinge 36. Locking and unlocking lever 35 includes a slit 38. In the normal open and normal closed positions of hood 11, i.e. before motor vehicle 1 has been involved in an accident, connecting element 25 is positioned inside slit 38, so that connecting element 25 is locked thereby, and first part 22 and second part 23 are therefore connected to each other not only at pivot 33 but a further connection also exists between first and second parts 22, 23 through locked connecting element 25 due to connecting element 25. Relative movement between first part 22 and second part 23 is thus blocked due to connecting element 25. Accordingly, FIG. 2 illustrates a closed position of locking and unlocking lever 35. A spring 37 is fastened both to hinge 36 or second part 23 and to locking and unlocking lever 35, thereby enabling a force to be applied to locking and unlocking lever 35 by spring 37, which force keeps locking and unlocking lever 35 in a closed position Airbag module 16 with airbag module housing 19 has a perforation 43 and a film hinge 42 on airbag module housing 19 (FIG. 4). When airbag 18 is deployed, airbag module housing 19 tears along perforation 43. This causes the formation of a flap 41 on the wall of airbag module housings 19. Thus, when airbag 18 is deployed, perforations 43 tear so that flap 41 opens, and flap 41 pivots correspondingly on film hinge 42.

In the event of an accident or imminent accident, both airbag modules 16 are activated. The deployment of both airbags 18 causes opening flaps 41 to exert a vertically downward force on actuation plate 39 of locking and unlocking lever 35 according to the representation of FIG. 2, that is to say the force is applied indirectly by airbag 18. This causes locking and unlocking lever 35 to pivot from the closed position shown in FIG. 2 into an opening position against the force exerted by spring 37 on locking and unlocking lever 35. Consequently, connecting element 25 is arranged outside slit 38, and connecting element 35 is unlocked to break the connection between first part 22 and second part 23 realized by connecting element 25. This enables first part 22 and second part 23 to move relative to each other, i.e. they can pivot about a pivot axis on pivot 33. The two opening airbags 18 also exert a vertically upwardly directed force on the rear end area of hood 11. Through the kinematics of hinge mechanism 20, this consequently enables the rear end of hood 11 to move vertically upward due to the pivoting relative movement between first and second parts 22, 23. In FIG. 3, hinge mechanism 20 is represented in the partly open accident position of hood 11. An upper side of first part 22 is thus aligned at an acute angle of approximately 40° relative to the upper side of second part 23. In the normal open and closed positions of hood 11, the upper side of first part 22 and the upper side of second part 23 are aligned parallel with each other as represented in FIG. 2. In FIG. 2, hinge mechanism 20 is shown in a normal closed position of hood 11.

Hinge mechanism 20 is fixed and arrested in the partly open accident position by a detent device 45. A detent lever 46 attached pivotably to first part 22 by a detent hinge 51. A detent spring 48 exerts a turning moment on detent lever 46, in the counterclockwise direction as shown in FIG. 2. A detent bolt 47 is attached to second part 23 and arranged inside a detent slit 49. Detent slit 49 is formed in first part 22. After bolt 26 is released, first part 22 is moved relative to second part 23 by pivot 33, so that detent bolt 47 moves downwards in detent slit 49. This movement of detent bolt 47 in detent slit 49 causes detent lever 46 to pivot clockwise against the force exerted by detent spring 48 until the positive lock between detent lever 46 and detent bolt 47 is disengaged. This allows detent lever 46 to pivot counterclockwise under the effect of the turning moment exerted on detent lever 46 by detent spring 48 until it reaches a rotational position that is blocked by the geometry of detent lever 46.

With detent lever 46 in this rotational position, detent bolt 47 is fixed in the lower position in detent slit 49, thereby blocking the relative movement of first part 22 with respect to second part 23. A shock absorber and deformation element 50 slows the movement of detent bolt 47 in detent slit 49 shortly before the movement ends at the bottom end of detent slit 49 due to a deformation of the shock absorber and deformation element 50. Mechanism 27 is also fixed in the partly open accident position and arrested either due corresponding kinematics of hinge mechanism 20 or with a further, auxiliary detent device (not shown).

In the normal closed position of hood 11, latching element 44 serves to block or lock the front end area of hood 11. Latching element 44 must be unlocked in order to move hood 11 from the normal closed position into the normal open position. When hood 11 from the normal closed position into the partly open accident position, latching element 44 serves as a hinge or pivot to pivot hood 11 from the normal closed position into the partly open accident position.

In a further embodiment, hinge mechanism 20 may include an auxiliary lever, and the force for moving locking and unlocking lever 35 from the closed position into the open position is first exerted on the auxiliary lever by flap 41 and then by the auxiliary lever on locking and unlocking lever 35.

In a further embodiment, the geometry of locking and unlocking lever 35 is such that locking and unlocking lever 35 is movable, particularly pivotable vertically upwards from the closed position into the open position by a force acting vertically upwards on actuation plate 39.

In general, significant advantages are associated with the motor vehicle 1 according to the present disclosure. The kinematics of mechanism 27 enables not only a pivoting movement about a pivot axis, but to a lesser degree also a vertically upward movement of the rear end of hood 11 when hood 11 moves from the normal closed position into the normal open position. As a consequence, engine compartment 21 is rendered particularly easily accessible for servicing work in engine compartment 21 in the normal open position of hood 11. The kinematics of hinge mechanism 20 may be altered substantially in the event of an imminent accident in that connecting element 25 is unlocked, thus enabling a pivoting movement between first and second parts 22, 23 at pivot 33. Consequently, hinge mechanism 20 enables rear end area of hood 11 to complete a sufficiently large vertically upward movement when hood 11 moves from the normal closed position into the partly open accident position without hood 11 executing or being able to execute a vertically upward movement at the front end of hood 11 as well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
    a vehicle body defining an engine compartment;
    a hood covering the engine compartment;
    an airbag module having an airbag configured to deploy in an area on an outer side of said vehicle body; and
    at least one hinge mechanism operably coupling the hood to the vehicle body so that the hood is positionable between a closed position in which the hood covers the engine compartment and an open position in which the hood uncovers the engine compartment for access thereto, the hinge mechanism including a first part, a second part, a mechanism supported on the second part so as to be movable relative to the body, the mechanism including at least one lever fastened to the body in a pivoting manner at a first hinge point and is fastened in pivoting manner to the second part at a second hinge point and a coupling interconnecting the first and second parts, wherein the coupling between the first and second parts is broken in the event of an accident enabling a rear end area of the hood to move relative to the vehicle body from the normal closed position into a partly open, accident position in the area of the front windscreen.

2. The motor vehicle according to claim 1, wherein the second part is movable relative to the body when pivoting the hood from the normally closed position into the normally open position and when moving the rear end area of the hood from the normally closed position into the partly open, accident position.

3. The motor vehicle according to claim 1, wherein the first part fixedly attached to the hood so that the first part moves in coordination with the hood between from the normally closed position into the normally open position and when moving the rear end area of the hood from the normally closed position into the partly open, accident position.

4. The motor vehicle according to claim 1, wherein the hinge mechanism further comprising a pivot interconnecting the first and second parts.

5. The motor vehicle according to claim 4, wherein a relative movement between the first and second parts is block by the coupling and the pivot.

6. The motor vehicle according to claim 1, wherein the first and second parts are pivotable with respect to each other about a pivot axis on the pivot for moving the rear end area of the hood from the normal closed position into the partly open accident position when the coupling is broken.

7. The motor vehicle according to claim 1, wherein the mechanism comprises two levers.

8. The motor vehicle according to claim 1, wherein the coupling is selected from the group consisting of a bolt or a pin.

9. The motor vehicle according to claim 1, wherein the coupling is permanently attached to one of the first and second parts and detachably attached to the other of the first and second parts.

10. The motor vehicle according to claim 1, wherein the first part comprising a plate element.

11. The motor vehicle according to claim 1, wherein the second part comprises a rod element.

12. The motor vehicle according to claim 1, wherein the second part comprises a strut.

13. The motor vehicle according to claim 1, wherein the first part is not deformed when the rear end area of the hood moves from the normal closed position into the partly open accident position.

14. The motor vehicle according to claim 1, wherein the coupling comprises a connecting element extending from the first part and a latch positionable between a first position for engaging the connecting element and a second position for disengaging the connecting element and breaking the coupling between the first and second part.

15. The motor vehicle according to claim 1, further comprising a detent mechanism having a detent lever configured to block relative movement of the first part with respect to the second part after the coupling therebetween is broken for maintaining the hood in the partly open, accident position.

16. The motor vehicle according to claim 1, wherein the detent mechanism further comprises a detent pin extending from the second part and received in a detent slit formed in the first part, wherein the detent lever is pivotally attached to the first lever.

17. A motor vehicle comprising:
a vehicle body defining an engine compartment;
a hood covering the engine compartment;
an airbag module having an airbag configured to deploy in an area on an outer side of said vehicle body; and
at least one hinge mechanism operably coupling the hood to the vehicle body so that the hood is positionable between a closed position in which the hood covers the engine compartment and an open position in which the hood uncovers the engine compartment for access thereto, the hinge mechanism including a first part, a second part, a mechanism supported on the second part so as to be movable relative to the body, a coupling interconnecting the first and second parts, the coupling including a connecting element and fixing mechanism detachably connected to the connecting element, wherein the fixing mechanism is actuatable by deployment of the airbag in the event of an accident so that the coupling between the first and second parts is broken enabling a rear end area of the hood to move relative to the vehicle body from the normal closed position into a partly open, accident position in the area of the front windscreen.

18. The motor vehicle according to claim 17, wherein in that the airbag is configured to exert a force on the fixing mechanism so that the actuation of the fixing mechanism breaks the coupling between the first and second parts.

19. The motor vehicle according to claim 17, wherein the fixing mechanism comprises a pivotable lever.

* * * * *